United States Patent [19]

Olson et al.

[11] Patent Number: 4,960,824

[45] Date of Patent: Oct. 2, 1990

[54] STORAGE STABLE POLYIMIDE PRECURSOR SOLUTIONS AND METHOD OF PREPARATION

[75] Inventors: Daniel R. Olson, Watervliet; Elbridge A. O'Neil, Jr., Port Henry, all of N.Y.

[73] Assignee: General Electric Company, Schenectady, N.Y.

[21] Appl. No.: 248,762

[22] Filed: Sep. 26, 1988

[51] Int. Cl.$^5$ ............................................. C08L 79/04
[52] U.S. Cl. ..................................... 524/600; 524/379; 524/391; 524/606; 524/607; 528/125; 528/126; 528/128; 528/172; 528/183; 528/185; 528/188
[58] Field of Search ............... 528/125, 126, 128, 172, 528/353, 185, 188, 183; 524/607, 379, 391, 600, 606

[56] References Cited

U.S. PATENT DOCUMENTS 3,312,663  4/1967  Sorenson .
3,700,649  10/1972  Boram et al. .
4,417,044  11/1983  Parekh ................................ 528/179

FOREIGN PATENT DOCUMENTS 1360488  6/1963  France .

OTHER PUBLICATIONS

Bell, *Polymer Letters*, 5, 941–946. (1967).
Serafini et al., *J. App. Poly. Sci.*, 16, 905–915 (1972).
Serafini et al., *App. Poly. Symp.* #22, 89–100 (1973).
Scrafini et al., *Status Review of PMR Polyimides*, ACS Symposium Series, 132, 15–24 (1980).

*Primary Examiner*—Harold D. Anderson
*Attorney, Agent, or Firm*—William H. Pittman; James C. Davis, Jr.

[57] ABSTRACT

Storage stable polyimide precursors are prepared from diesters of certain tetracarboxylic acids, including pyromellitic acid and 2,2-bis[4-(3,4-dicarboxyphenoxy)-phenyl]propane, and m-phenylenediamine, p-phenylenediamine, 4-aminophenyl ether or mixtures thereof. These polyimide precursors may be cured to form flexible polyimides useful in composite preparation.

29 Claims, No Drawings

STORAGE STABLE POLYIMIDE PRECURSOR SOLUTIONS AND METHOD OF PREPARATION

This invention relates to polyimide precursors and methods for their preparation. More particularly, it relates to storage stable solutions of polyimide precursors, capable of conversion to polyimides under conditions adaptable for composite formation.

Polyimides are a class of synthetic resins notable for their high thermal and oxidative stability and solvent resistance. Because of these properties, they are particularly promising for the formation of filled composites for use in the fabrication of such articles as engine parts employed at high temperatures.

The most common method for preparing polyimides is by the reaction of tetracarboxylic acid dianhydrides with diamines. An intermediate in this method of preparation is the corresponding polyamic acid, in which the structural units are linked by amide groups each of which is paired with a neighboring carboxylic acid group. These polyamic acids are, for the most part, insoluble in common volatile solvents. Therefore, their preparation requires the use of a dipolar aprotic solvent such as dimethylformamide, dimethylacetamide, dimethyl sulfoxide or N-methylpyrrolidone.

Upon baking of the polyamic acid solution after removal of the aprotic solvent, conversion to the desired polyimide takes place. However, it is difficult to remove all traces of such solvents by reason of their high boiling points. In the formation of composites, remaining traces of solvents can lead to voids in the final structure which adversely affect their physical properties.

A second known method for preparing polyimides involves a first step of reaction of the dianhydride with an alcohol to form a diester in which each carboxylic acid ester group is paired with a free carboxylic acid group. Said carboxylic acid groups can then react with a diamine to form an intermediate which is converted upon heating to the polyimide. Various aspects of this method are disclosed in U.S. Pat. Nos. 3,312,663 and 3,700,649, French patent No. 1,360,488, and the following other references:

Bell, Polymer Letters, 5, 941–946 (1967)
Serafini et al., J. App. Poly. Sci., 16, 905–915 (1972)
Serafini et al., App. Poly. Symp. #22, 89–100 (1973)
Serafini et al., Status Review of PMR Polyimides, ACS Symposium Series, 132, 15–24 (1980).

Also relevant in this regard is copending, commonly owned application Serial No. 223,746, filed July 15, 1988 now U.S. Pat. No. 4,874,835.

It has been found, however, that the diester route to polyimides is not uniformly effective to produce storage stable precursor solutions. Many combinations of diesters and diamines, in the form of solutions in the alcohols used to form the diesters, undergo at least partial precipitation upon storage. Even removal of the precipitate by filtration or the like does not always yield precursor solutions convertible to polyimides having the desired properties, since such polyimides are frequently found to be brittle.

The present invention is based on the discovery of a specific class of tetracarboxylic acid dianhydrides and diamines which are convertible to storage stable polyimide precursor solutions under the above-described conditions, said solutions in turn being convertible to flexible polyimides upon heating. In particular, the dianhydrides may be converted to tetracarboxylic acid diesters by reaction with alcohols. Solutions of said diesters and a specific class of diamines in said alcohols are storage stable and are readily convertible to flexible polyimides, suitable for composite formation. As used herein, "storage stable solution" means a solution which remains homogeneous at room temperature for periods of time longer than about four hours. The polyimide precursor solutions of the present invention frequently remain homogeneous for several months.

One aspect of the present invention is a method for preparing a storage stable polyimide precursor composition which comprises blending, at a temperature up to about 50° C.:

(A) at least one diamine selected from the group consisting of m-phenylenediamine, p-phenylenediamine and 4-aminophenyl ether;

(B) a tetracarboxylic acid diester of the formula

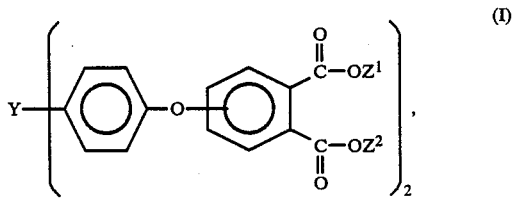

or a mixture thereof with a tetracarboxylic acid diester of the formula

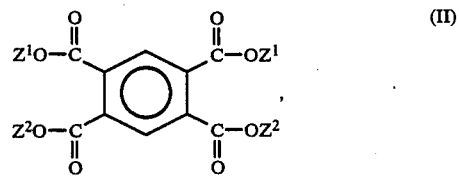

said mixture containing up to about 50 mole percent of the diester of formula II; and (C) an amount of at least one alkanol of the formula ROH to provide a solution containing reagents A and B, or any reaction products of any of reagents A, B and C, in the amount of up to about 80% by weight;

wherein R is an alkyl radical containing about 1–4 carbon atoms, Y is a linear or branched alkylene radical containing about 1–6 carbon atoms, and one of $Z^1$ and $Z^2$ is R and the other is hydrogen.

Reagent A used in the invention is at least one diamine selected from the group consisting of m- and p-phenylenediamine and 4-aminophenyl ether (also known as 4,4'oxydianiline). If a diamine mixture is employed, the proportions thereof are not critical, but it is frequently convenient to employ a mixture of two diamines in which each is present in the proportion of about 25–75 mole percent. The phenylenediamines are frequently preferred. Moreover, when a dianhydride mixture is employed as reagent B as described hereinafter, m-phenylenediamine or a mixture thereof with 4-aminophenyl ether is frequently preferred.

Reagent B is a tetracarboxylic acid diester of formula I, or a mixture thereof with a diester of formula II. In formula I, the Y radical is a linear or branched alkylene radical containing about 1–6 and most often about 1–4 carbon atoms. Methylene and substituted methylene radicals are preferred, with isopropylidene being especially preferred.

The $Z^1$ and $Z^2$ radicals are, respectively, R and hydrogen or hydrogen and R, wherein R is an alkyl radical containing about 1–4 carbon atoms. Thus, each carboxy-substituted aromatic ring has one carboxy group and one ester group. R is most often methyl or ethyl and preferably methyl.

Preferred as diesters of formula I are those of the 2,2-bis[4-(dicarboxyphenoxy)phenyl]propane tetracarboxylic acids. Either the 2,3- or the 3,4-dicarboxyphenoxy isomer may be employed, with the 3,4-isomer generally being preferred.

The diester of formula I may be employed in admixture with a diester of formula II, which is a derivative of pyromellitic acid. Any such mixtures most often contain at least about 50 and preferably at least about 60 mole percent of the diester of formula I.

The diesters used as reagent B may be prepared by reaction of the corresponding dianhydrides with at least one alkanol of the formula ROH. For this purpose, a solution of one or both dianhydrides in the alkanol may be prepared, about 5–30 moles of the alkanol being present per mole of dianhydride, and subjected to conventional esterification conditions which typically include heating at reflux.

Minor proportions of esters other than the diester may be present in reagent B, but they are not believed to contribute significantly to the invention. The facile formation of the desired diester is one reason for the employment of dianhydrides as opposed to tetracarboxylic acids.

Reagent C is an alcohol of the type employed for the preparation of reagent B. It is most often furnished by the excess alkanol used for esterification, although it is within the scope of the invention to add more alkanol after esterification is complete. The total amount of reagent C employed is sufficient to produce a solution containing reagents A and B, or any reaction products of said reagents with each other and/or with reagent C, in an amount up to about 80% and preferably 50–70% by weight.

In the method of this invention, a mixture of reagents A, B and C is maintained at a temperature up to about 50° C. in polyimide-forming proportions. Reagents A and B are typically employed in substantially equimolar amounts for a polyimide of high molecular weight. It is well known in the art that the proportions may be varied in order to control the molecular weight of the product. The incorporation in appropriate amounts of conventional endcapping agents for molecular weight control, such as phthalic anhydride or aniline, is within the scope of the invention.

Polyetherimide precursor compositions prepared by the above-described method are another aspect of the invention. The principal product therein is believed to be a polymeric amine salt of the tetracarboxylic acid diester. Its formation is frequently evidenced by a noticeable thickening of the reaction mixture.

The polyetherimide precursor compositions of this invention may be converted into polyetherimides by gently heating to remove excess alkanol by evaporation and form a prepolymer, and subsequently baking said prepolymer at a temperature in the range of about 275–375° C. They are particularly adapted to the formation of composites by impregnation of typical fillers or reinforcing media such as glass fiber, polyester fiber, polypropylene fiber, cellulosics, nylon or acrylics.

The temperature required to remove alkanol by evaporation will, of course, vary with the boiling point of the alkanol employed. Under many circumstances, it is convenient to increase the temperature of the composition gradually to the baking temperature in a single operation. As the temperature increases, alkanol is removed and a prepolymer is formed, principally by (at least in overall effect) dehydrating the polymeric amine salt to form a polyamic acid. With continued heating, the polyamic acid is itself dehydrated to form the desired polyimide.

The invention is illustrated by the following examples. All parts are by weight.

EXAMPLE 1

A solution of 5.2 parts (10 mmol.) of 2,2-bis[4(3,4-dicarboxyphenoxy)phenyl]propane dianhydride (hereinafter "BPADA") in 6.28 parts (196 mmol.) of methanol was heated under reflux for 2 hours and cooled. There was then added 1.08 parts (10 mmol.) of p-phenylenediamine, to produce a polyether precursor solution containing 50% reactants.

A portion of the solution was drawn down to a 2-mil film on a glass plate and heated in an oven whose temperature was increased from 50° C. to 330° C. at a rate of 30° C. per minute, and then at 330° C. for 1 hour. There was obtained a film of a tough polyimide having a glass transition temperature of 229° C.; said polyimide was insoluble in methylene chloride, o-dichlorobenzene and N-methylpyrrolidone.

A second portion of the polyimide precursor solution was aged for 62 days at room temperature. No precipitation or gelation occurred during that time. Subsequent curing as described above yielded a tough polyimide film having a glass transition temperature of 228° C.

EXAMPLE 2–5

Following the procedure of Example 1, storage stable polyimide precursor solutions were prepared and were converted to polyimides. The details are given in the following table.

|  | Example | | | |
| --- | --- | --- | --- | --- |
|  | 2 | 3 | 4 | 5 |
| Dianhydride, mmol.: | | | | |
| BPADA | 10 | 7 | 6 | 9.7 |
| Pyromellitic dianhydride | — | 3 | 4 | — |
| Diamine, mmol.: | | | | |
| p-Phenylenediamine | 10 | — | — | 10 |
| m-Phenylenediamine | — | 10 | 5 | — |
| 4-Aminophenyl ether | — | — | 5 | — |
| Endcapping monoanhydride, mmol.: | | | | |
| Phthalic anhydride | — | — | — | 0.6 |
| Methanol, mmol. | 84 | 168 | 204 | 194 |
| Precursor soln., % reactants | 70 | 50 | 50 | 50 |
| Polyimide Tg, °C. | — | 240 | 249 | 215 |

Two control experiments were run, using the same procedure. In Control A, 10 mmol. each of pyromellitic dianhydride and p-phenylenediamine and 102 mmol. of methanol were employed to produce a polyimide precursor solution, in which an insoluble precipitate formed after 5 minutes.

In Control B, 10 mmol. each of bis(3,4-dicarboxyphenyl) ketone dianhydride and 134 mmol. of methanol were employed. An insoluble precipitate formed in about 2 hours and was removed by filtration. The filtrate was drawn down and a polyimide film was formed as in Example 1. Said film was brittle and could not be bent back on itself. A second portion of the solution was aged for one day and converted to a polyimide, which was cracked and very brittle.

What is claimed is:

1. A method for preparing a storage stable polyimide precursor composition which comprises blending, at a temperature up to about 50° C.:
   (A) at least one diamine selected from the group consisting of m-phenylenediamine, p-phenylenediamine and 4-aminophenyl ether;
   (B) tetracarboxylic acid diester of the formula

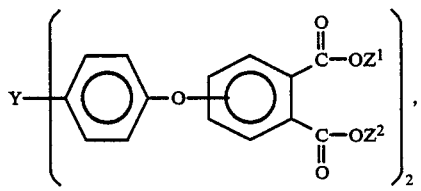
(I)

or a mixture thereof with a tetracarboxylic acid diester of the formula

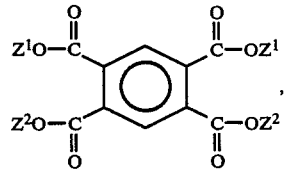
(II)

said mixture containing up to about 50 mole percent of the diester of formula II; and
   (C) an amount of at least one alkanol of the formula ROH to provide a solution containing reagents A and B, or any reaction products of any of reagents A, B and C, in the amount of up to about 80% by weight;
   wherein R is an alkyl radical containing about 1–4 carbon atoms, Y is a linear or branched alkylene radical containing about 1–6 carbon atoms, and one of $Z^1$ and $Z^2$ is R and the other is hydrogen.

2. A method according to claim 1 wherein reagent B is prepared by reaction of the corresponding dianhydride with at least one alkanol of the formula ROH.

3. A method according to claim 2 wherein about 5–30 moles of alkanol is employed per mole of dianhydride.

4. A method according to claim 3 wherein reagent B has formula I.

5. A method according to claim 4 wherein the compound of formula I is a diester of 2,2-bis[4-(3,4-dicarboxyphenoxy)phenyl]propane.

6. A method according to claim 5 wherein R is methyl.

7. A method according to claim 6 wherein reagent A is p-phenylenediamine.

8. A method according to claim 3 wherein reagent B is a mixture of a diester of formula I and a pyromellitic acid diester, the former being present in the amount of at least about 50 mole percent.

9. A method according to claim 8 wherein the compound of formula I is a diester of 2,2-bis[4-(3,4-dicarboxyphenoxy)phenyl]propane.

10. A method according to claim 9 wherein reagent A is m-phenylenediamine.

11. A method according to claim 10 wherein R is methyl.

12. A storage stable polyimide precursor composition prepared by the method of claim 1.

13. A storage stable polyimide precursor composition prepared by the method of claim 4.

14. A storage stable polyimide precursor composition prepared by the method of claim 5.

15. A storage stable polyimide precursor composition prepared by the method of claim 6.

16. A storage stable polyimide precursor composition prepared by the method of claim 7.

17. A storage stable polyimide precursor composition prepared by the method of claim 8.

18. A storage stable polyimide precursor composition prepared by the method of claim 9.

19. A storage stable polyimide precursor composition prepared by the method of claim 10.

20. A storage stable polyimide precursor composition prepared by the method of claim 11.

21. A composition comprising:
   (A) at least one diamine selected from the group consisting of m-phenylenediamine, p-phenylenediamine and 4-aminophenyl ether;
   (B) a tetracarboxylic acid diester of the formula

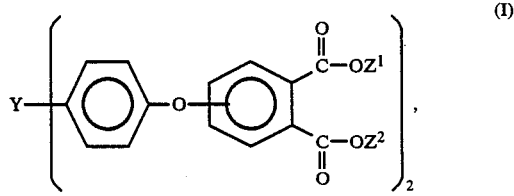
(I)

or a mixture thereof with a tetracarboxylic acid diester of the formula

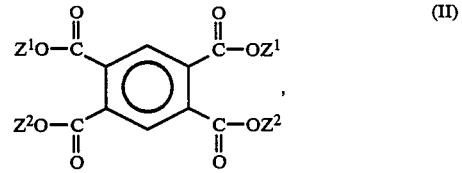
(II)

said mixture containing up to about 50 mole percent of the diester of formula II; and
   (C) an amount of at least one alkanol of the formula ROH to provide a solution containing reagents A and B and any reaction products of any of reagents A, B and C in the amount of up to about 80% by weight;
   wherein R is an alkyl radical containing about 1–4 carbon atoms, Y is a linear or branched alkylene radical containing about 1–6 carbon atoms, and one of $Z^1$ and $Z^2$ is R and the other is hydrogen.

22. A composition according to claim 21 wherein reagent B has formula II.

23. A composition according to claim 22 wherein the compound of formula I is a diester of 2,2-bis[4-(3,4-dicarboxyphenoxy)phenyl]propane.

24. A composition according to claim 23 where R is methyl.

25. A composition according to claim 24 wherein reagent A is p-phenylenediamine.

26. A composition according to claim 21 wherein reagent B is a mixture of a diester of formula I and a pyromellitic acid diester, the former being present in the amount of at least about 50 mole percent.

27. A composition according to claim 26 wherein the compound of formula I is a diester of 2,2-bis[4-(3,4-dicarboxyphenoxy)phenyl]propane.

28. A composition according to claim 27 wherein reagent A is m-phenylenediamine.

29. A composition according to claim 28 wherein R is methyl.

* * * * *